US011625795B2

(12) United States Patent
Costello et al.

(10) Patent No.: US 11,625,795 B2
(45) Date of Patent: Apr. 11, 2023

(54) DIGITAL SEARCH AND COLLABORATION PROCESS FOR RECOMMENDATIONS, ADVERTISING, AND BUYING DECISIONS

(71) Applicant: Builders Digital Experience, LLC, Austin, TX (US)

(72) Inventors: Tim Costello, Austin, TX (US); Mark Law, Austin, TX (US); Krishna Murthy, Austin, TX (US); Peter Brumme, Austin, TX (US); Drew Leakey, Austin, TX (US)

(73) Assignee: Builders Digital Experience, LLC, Austin, TX (US)

( * ) Notice: Subject to any disclaimer, the term of this patent is extended or adjusted under 35 U.S.C. 154(b) by 271 days.

(21) Appl. No.: 16/436,005

(22) Filed: Jun. 10, 2019

(65) Prior Publication Data

US 2019/0378226 A1 Dec. 12, 2019

Related U.S. Application Data

(60) Provisional application No. 62/682,335, filed on Jun. 8, 2018.

(51) Int. Cl.
 *G06Q 50/16* (2012.01)
 *G06Q 30/0601* (2023.01)
 (Continued)

(52) U.S. Cl.
 CPC ......... *G06Q 50/16* (2013.01); *G06Q 30/0242* (2013.01); *G06Q 30/0276* (2013.01);
 (Continued)

(58) Field of Classification Search
 CPC ............... G06Q 50/16; G06Q 30/0631; G06Q 30/0276; G06Q 30/0643; G06Q 30/0242; G06Q 30/0282
 See application file for complete search history.

(56) References Cited

U.S. PATENT DOCUMENTS

| 2011/0106721 A1* | 5/2011 | Nickerson | G06Q 30/02 715/764 |
| 2011/0244919 A1* | 10/2011 | Aller | G06Q 30/06 382/165 |

(Continued)

OTHER PUBLICATIONS

A. A. Ward, S. J. McKenna, A. Buruma, p. Taylor and Junwei Han, "Merging technology and users: Applying image browsing to the fashion industry for design inspiration," 2008 International Workshop on Content-Based Multimedia Indexing, 2008, pp. 288-295, doi : 10.1109/CBMI.2008.4564959. (Year: 2008).*

(Continued)

*Primary Examiner* — Sun M Li
(74) *Attorney, Agent, or Firm* — Pillsbury Winthrop Shaw Pittman LLP

(57) ABSTRACT

Disclosed are systems, methods, and media having at least one processor; and a non-transitory computer-readable medium storing instruction which, when executed by the at least one processor, cause the at least one processor to perform operations comprising receiving from one or more sources images related to a plurality of features of housing offerings, said images being associated with other images related to features of housing offerings; presenting to a first user an initial prompt and based on response to that initial prompt, presenting a plurality of selectable images related to a first feature of housing offerings; receiving from the first user input regarding the desirability of the images related to the first feature of housing offerings; and iteratively deriving, based on inputs regarding the desirability of the images related to one or more of the plurality of features of housing offerings, a hypothesis regarding a different feature of housing offerings; based at least in part on the hypothesis, presenting to the first user images related to the different feature of housing offerings; and receiving from the first user (Continued)

input regarding the desirability of the images related to the different feature of housing offerings.

20 Claims, 3 Drawing Sheets

(51) Int. Cl.
*G06Q 30/0241* (2023.01)
*G06Q 30/0242* (2023.01)
*G06Q 30/0282* (2023.01)

(52) U.S. Cl.
CPC ..... *G06Q 30/0282* (2013.01); *G06Q 30/0631* (2013.01); *G06Q 30/0643* (2013.01)

(56) References Cited

U.S. PATENT DOCUMENTS

2014/0169686 A1* 6/2014 Conwell .................. G06T 3/00
382/218
2014/0316857 A1* 10/2014 Roberts ................. G06Q 50/16
705/7.34

OTHER PUBLICATIONS

D. Sacha, A. Stoffel, F. Stoffel, B. C. Kwon, G. Ellis and D. A. Keim, "Knowledge Generation Model for Visual Analytics," in IEEE Transactions on Visualization and Computer Graphics, vol. 20, No. 12, pp. 1604-1613, Dec. 31, 2014, doi: 10.1109/TVCG.2014. 2346481. (Year: 2014).*

* cited by examiner

DIGITAL SEARCH AND COLLABORATION PROCESS FOR RECOMMENDATIONS, ADVERTISING, AND BUYING DECISIONS

CROSS REFERENCE TO RELATED APPLICATIONS

This application claims priority to Provisional Patent Application No. 62/682,335, filed Jun. 8, 2018.

BACKGROUND OF THE INVENTION

Field of the Invention

The present disclosure is related to devices for performing searches and making recommendations, more specifically to a system to evaluate real estate information.

In the existing art, houses are marketed to consumers beginning with information not typically key to many consumers in their purchases. Existing new house marketing focuses on photographs of the exterior of the home filtered by textual inputs of bedroom, bathroom, and square footage, among other things. These marketing techniques ignore that house preferences are frequently driven more on preferences in particular rooms, more subjective in nature, can be based on the internal style, finish-out, layout, footprint, and other factors not typically efficiently captured by existing marketing tools.

Moreover, the existing art is based on a single user's selections. The digital platforms generally allow for a user through his or her workspace or computing device to identify and select desirable houses to pursue further or disregard. In this manner, the existing platforms do not facilitate multiple user collaboration in determining the desirability of any particular home. Nor do existing platforms facilitate the organic or iterative process engaged between multiple co-purchasers, instead focusing on input from each user isolated from those of a co-purchaser.

Existing internet-based search options are limited in their searching capability to filtering and search engine-like searches, where houses are selected based on filtering of objective criteria such as room numbers, garages, bathrooms, etc. Searches are also available but merely produce results that are the direct product of the input of the user.

These prior art searches cause the computing system to be slow and inefficient at zeroing in on desirable houses by causing repetitive and tangentially related tasks to be performed that are not the main drivers of house preference for typical buyers.

There is a present need in the market for a system that allow for faster searching based on actual user preferences that can allow for collaborative searches and can incorporate present and historic trends in housing purchases.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
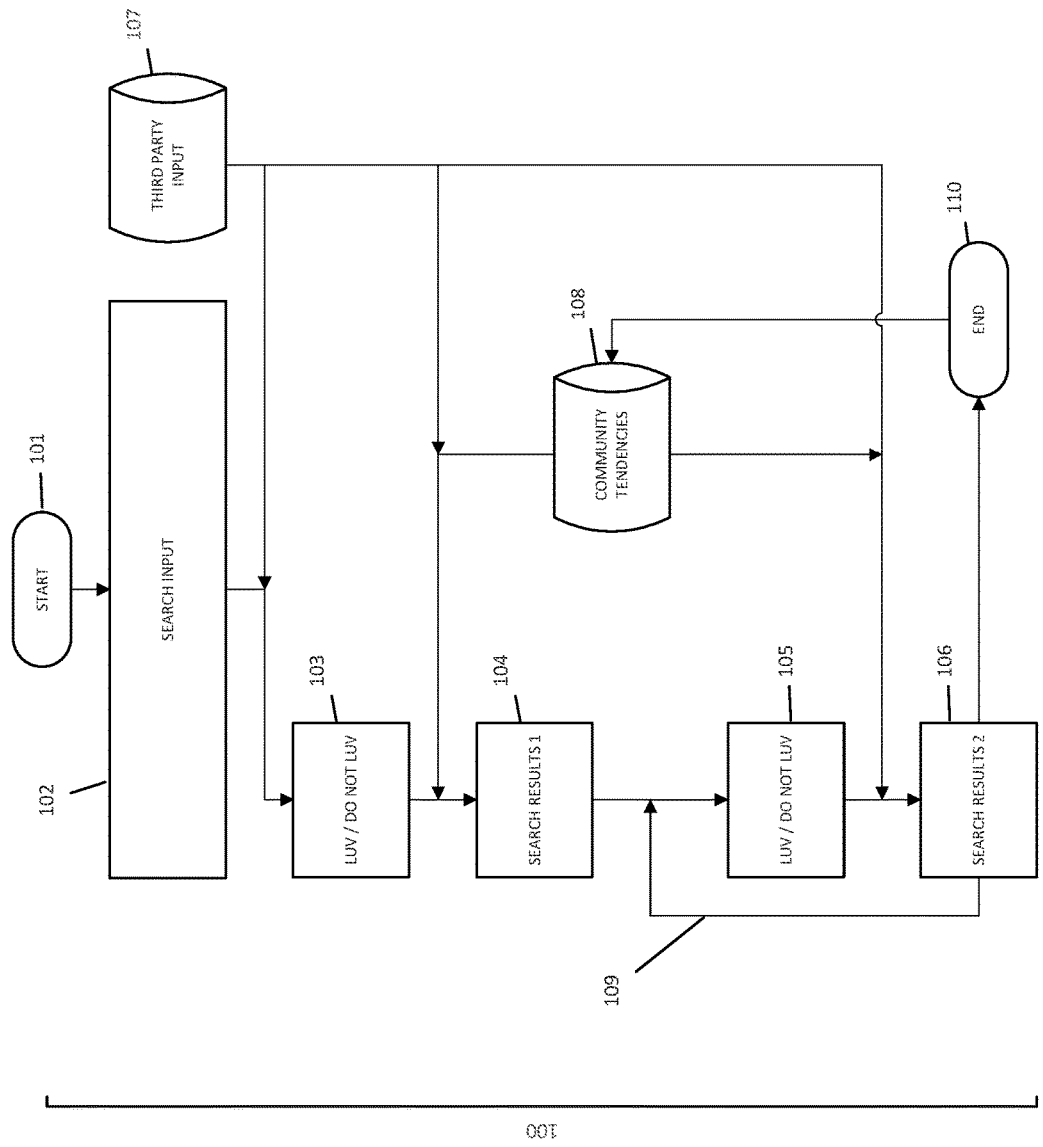
FIG. 1 is a diagrammatic representation of an iterative search process in accordance with certain embodiments of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

To mitigate the problems described herein, the inventors had to both invent solutions and, in some cases just as importantly, recognize problems overlooked (or not yet foreseen) by others in the fields of computer science, house marketing or human computer interaction. Because multiple problems are addressed, it should be understood that some embodiments are problem-specific, and not all embodiments address every problem with traditional systems described herein or provide every benefit described herein. That said, improvements that solve various permutations of these problems are described below.

Image Reviews

In certain embodiments, the system disclosed herein facilitates reviews based on images. In certain embodiments, images can be of inspirations related to home decor, setup, layout, finish-out, and other details of a specific room (e.g. bedroom, bathroom, kitchen), house or a series of houses.

In certain embodiments, images are accessed on a local device of a user, including a computer, tablet, smart-phone, laptop or other computing device. The images can be presented via screens, still images, videos, virtual reality, augmented reality, manipulateable and immersive spaces. The devices operable with the system and methods typically have processors and are interconnected with other devices to allow transmission of images from one or more databases or hosting sites wherein images are hosted, such as via the Internet.

Images can be sourced in a number of ways. In certain embodiments, the images can comprise images from professional commercial builders or marketed on behalf of the builders or persons selling on their behalf. These builders frequently build and market new homes using high qualify professional images of their houses, rooms within, and exterior spaces. In situations in which the builders build multiple houses, these images can be relevant to a number of existing and to-be built houses. Images can be sourced from product retailers, social media platforms and otherwise. The images are accessible to the users prior to visiting any houses. Images can be renderings based on various input and recreated as a room or other feature relevant to house buying.

In certain embodiments, images are imported and stored locally for search and presentation to the user. In certain embodiments, images are stored with one or more third parties and the system can query relevant databases or other storage techniques for relevant images. Images are associated with metadata and fields related to the data, including information on the availability of the room shown in the image, the individual items within the image, cost, associated houses, locations, features of the surrounding locality, availability, appropriate lot size, and other appropriate fields. It should be understood that the metadata and related fields mentioned herein are not limited to those explicitly listed, and this should not be taken to understand that anything else in this application is limited. Images may also be created or stored in local storage or may be sourced in other appropriate manners.

In certain embodiments, images are evaluated by the users. Images can be reviewed and rated by the user as favorable and not-favorable. In certain embodiments, favorable and non-favorable ratings can be shown by selecting of appropriate buttons, for instance, radio buttons or selectable images of a heart and a broken heart to indicate a favorable and non-favorable impression, respectively. Other mutually exclusive selections are possible, e.g., toggles between favorable and unfavorable. In other certain embodiments, selections and ratings are possible of other characteristics of the device, including ranges of favorability and ratings for different properties other than favorability, for instance, views regarding quality of goods, compatibility with overall intended style, rankings against or between comparable choices, etc. Coding related to the selection can range from simple radio buttons (shown in HTML): (<input type="radio" name="favorability" value="luv"> LUV <input type="radio" name="favorability" value="dislike"> Dislike) to more sophisticated choices or input types. In one particular embodiment, the images are processed to include a drawing of one or more hearts superimposed over a portion of an image and allow for selection of coloring the heart red if to indicate a favorable impression of the image and a coloring of black to indicate an unfavorable impression of the image. A favorable impression on one image can be associated with certain of the metadata associated with the image. Likewise, an unfavorable impression can be associated with certain of the metadata associated with the image. These associations can be utilized in later analysis to create recommendations to the consumer.

Likewise, in some embodiments, users can comment on certain images. Commenting can be performed by, e.g., providing to the user a text box and associating the text box with a particular image. There, a user can write any text for any reason. Alternatively, the images can have pre-chosen text can be selected. These comments, either based on the limited choices or through natural language processing (NLP) of the open-ended commenting, can be used as input for additional processing and analysis discussed elsewhere herein. Natural language processing can be based on pre-determined n-grams, key words, or otherwise.

Other languages are particularly suited for coding and creating the systems and processes described herein include javascript, angularjs and other languages.

In certain embodiments, the images are accessed through the implementation of noSQL, SQL, and newSQL databases. These databases are searchable and images are retrievable based on, e.g., attributes of the images. In certain embodiments, the images are presented to the user on the user's device for viewing, stored in local cache memory, as deleted according to the parameters of the user's local device.

In many embodiments, the images are interrelated based on their common characteristics. In these embodiments, the images are associated with metadata, and where such metadata overlaps with metadata of other images, allows the images to be interrelated. By example, images of a kitchen can be associated with certain fields regarding the builder, the style of the house the kitchen can be found in, the approximate price point for a house containing that kitchen, other rooms in houses containing that kitchen, neighborhoods and neighborhood details having houses with the selected kitchen, similar kitchens, or otherwise. In this manner, other relevant images can be associated with the selected kitchen. For instance, certain bathrooms similarly carrying the metadata of being built by a particular builder or being in a particular neighborhood, or in a particular style house, or found in houses of a particular range of square feet, could be associated with the image of the kitchen with the same metadata tags.

Product Reviews

In certain embodiments, users communication between themselves including evaluations of different subjects. A subject can be home decoration, furnishing, art, and other pieces of home décor. The evaluations can include simple indications of likes or dislikes of a particular subject, a numerical or letter rating of the subject, ranking of subjects, or otherwise. Comments can also be added regarding a subject through free form input, selection of radio buttons, menus, or otherwise.

In some embodiments, the evaluations can be of images presented to the user on the user's device. The images can include products, services, conceptual layouts, materials, colors, inspirational pieces or otherwise. The images can be sourced based on importation of images from other interconnected devices, others using the same or similar platforms, third parties including retailers, makers, advertisers, or otherwise. The images can be sourced from hosting services, and they can be identified by metadata, tags, visual scans, or otherwise.

Artificial Intelligence/Machine Learning

In certain embodiments, the system analyzes user specific preferences and behaviors and matches those preferences to purchasing options and combinations. The user specific preferences can be indications of a variety of items or characteristics, including without limitation product preferences, material preferences, color schemes, regional decor schemes, layout preferences, age, tonal themes, brands, product price-points, popularity, rarity, sourcing, availability, geometric properties, size, and durability. Additional preferences can be largely exterior to the house itself, including community size, school quality, distance from certain points, neighborhood or community characteristics, and others. Input can be in the form of pictures selected, textual comments, or otherwise.

In one particular embodiment, the user begins with choosing a room. In this embodiment, the user chooses the room that most drives the purchase for that user, for instance, a cook may find the kitchen to be the most important room for his or her purchase decisions. The system opens to a series of photos for kitchens. These photos include for example, professional photos done of existing plans and to-be-built homes. The user can indicate a preference or distaste for any particular picture (e.g., "luv'd" or "not luv'd"). The preferences and dislikes can be shared with a co-purchasing person. In a coordinated manner, the system allows the co-purchasing person to conduct his or her own review of a room of deemed importance, similarly identifying liked and disliked features and similarly sharing those preferences with the other party for comment and indications of luv'd or dislike. Based on one or both of the purchasers' preferences, the system can recommend one or multiple houses. In some embodiments, the houses are presented in a ranked style, with houses deemed more suitable toward the front of the list and those least desirable, or least desirable above a particular threshold, at the end of the list. The ranking can be manipulated by the system according to any appropriate criteria, including third party marketing preferences, time-on-the-market for certain houses, proximity to any favorable or distance from any unfavorable factor, previous consumer purchasing patterns and housing sales, and consumer behavior and other such appropriate factors.

In this manner, the process can be iterative in certain embodiments. The users can decide preferences, mark particular choices, share those choices, and seek consensus on a room image, content within an image, a group of images, and/or a target property, community and builder. The process can become iterative at any step. The users can decide on a particular preference and proceed with the search according to that preference. The users can later restart the search for other preferences resulting in different recommended houses, builders and communities. Or, the users can finalize their preferences and continue to seek consensus on a property until consensus is reached. The iterative process can be the results of the search itself. The users can input information and result in a plurality of houses, builders and communities as recommendations. The houses, builders and communities, which in certain embodiments are the result of the initial search, can be the beginning information for a new search. In particular embodiments, the houses are the beginning of a new search, and the results of that search are conducted automatically without additional information from the user and presented as a result of the initial search. For instance, a search may lead to commonalities in properties that other properties share, despite not being a strict match of the original search. Those other properties are then displayed as options. For instance, a search results in a threshold percentage of a particular builder's houses as being likely targets; the system recommends other houses by that builder.

The pictures of any level of the hierarchy of selection can be ordered based on different factors depending on the embodiment including external criteria regarding the housing market and availability, presumed purchasing power of the buyer based on received demographic data, desire to market particular houses or builders, and other appropriate factors. The system can gain information and weigh it as appropriate for the specific marketing environment. For instance, external information regarding house inventory and sales outlook can be used in the weighing of criteria presenting as more favorable houses in neighborhoods where projections indicate more houses need to be sold.

Through machine learning techniques, in some embodiments, consumer and design suggestions are made based on the inputs of the users. In some embodiments, other criteria are used in addition to user choices, including without limitation information from third parties including product availability or promotions.

In some embodiments, the machine learning would utilize inductive logic to present suggestions and options to the users. In certain of these embodiments, the preferences of the user (or other appropriate factors to be determined) are based on inductive learning programming. In some or all of these techniques, the system selects hypotheses based on some or all of user history, available inventory, promoted products, and larger population history. In these embodiments, results can be biased based on any of the above categories, or other appropriate categories. These hypotheses can be principal hypotheses or intermediate hypotheses.

Upon the system selecting the hypothesis that most corresponds with the input (e.g., the user activity), the additional suggested search results are based on that hypothesis.

In certain embodiments, the preferences of the users as indicated by "luvs" and dislikes ("do not luv") are used to determined possible matches for houses. In one embodiment, an image is presented to the user that contains metadata related to a number of different pertinent fields. By example, the image could be a picture of a kitchen lay-out. The fields include the builder, the location, the price-point, the square footage, the color palate, the appliance brands, the presence of an island, hood, faucet, cabinetry, range, etc. If the user indicates preferences, these preferences can be used as filters to eliminate certain houses, builders, geographic area, price points, etc.

In some use cases, the customized searches by the user(s) are supplemented with external information. That is, in a search history that indicates particular high end preferences, the system could recommend builders that are high end, or neighborhoods that are high end, or furnishings within the house as high end. Other examples include recommendations based on houses that are scheduled to become available, or neighborhoods with high house inventory.

In certain embodiments, the result of the search process provides the suggestions of homes or parts of homes that are of interest to the buyer, and recommends a home different from the to-be-bought house for review. In this embodiment, many advantages are gained, including having distant buyers review a house that is partially or totally analogous with the to-be-purchased house. For instance, a search result may show that the buyer is interested in a house in a distant state with layout A. The system will identify and recommend to the buyer that there is a nearby house (such as a model home) with layout A and allow for connection with a buyer on reviewing such a home locally. Alternatively, the immersive system could generate a house with a particular layout for the user to digitally experience.

In certain embodiments, the results of the search can be a range of houses that meet the criteria, plus additional houses that have certain preferred characteristics based on the search data to that point. In a particular example, if a series of criteria and a search results in a pattern of a user liking houses by builder X, the tool recommends other homes by builder X in the same area. Or, if a search results in a user likes a threshold number or percentage of houses in neighborhood or community Y, the system may recommend to the user other houses in neighborhood or community Y. In other embodiments, the results of the search can be a listing of builders or communities that the user seems to prefer, with additional information or functionality to facilitate contacting a preferred builder.

In many embodiments, the search results produce information other than recommended houses. The search results at any given step do not have to explicitly be a house. It can be information related to houses in a number of ways. For instance, a process of "luving" and "not luving" a particular series of kitchens can result in, among other things, a series of bathrooms associated with the "luv'd" kitchens and relevant external data including third party housing information or community preferences. Alternatively, a search result can be information related to appropriate buyers, appropriate price points, appropriate lots, or otherwise.

An exemplary computing process to implementing one embodiment of the machine learning discussed herein is the below. A user is exposed to a graphical user interface on a web portal or other internet access on a computing device. The options on the initial screen offer the user a choice of rooms to begin (e.g., kitchen, bathroom, dining room) with or without the ability to add additional objective information for the search. Based on the selection, the system provides images related to the selection, e.g., if kitchen was chosen, the images produced are images of appropriate kitchens. If a kitchen was chosen plus a pre-constructed user profile exists indicating houses of a particular size or price point, the search images would be kitchens that also meet the additional criteria. The images are superimposed with selectable hearts to allow the user to indicate approval or disapproval of the image. The approval and disapproval of the images, as associated with the underlying metadata of the image, is used as input for additional analysis. The input can be a partial input set, combined with additional external inputs from the system, iterative results, or third parties, including house builders, realtors, and lenders. The input can be information related to builder availability, relevant neighborhoods, price points, home availability, promoted houses, population trends, other rooms associated with the selected and luv'd homes, community trend information, and other inputs. Based on the selection of the user, the preferences of the user in the forms of indications of approvals and disapprovals, metadata associated with the selections, and the external inputs provide appropriate outputs.

The output from the initial selection can be a variety of types, including recommendations of one or more houses, recommendations of one or more builders, recommendations of one or more neighborhoods, recommendations of one or more other rooms, recommendations of a price point, price range, or price targets, and recommendations on ancillary and adjacency information such as schools, recreation facilities, and public facilities. The type of output is related to the input. This output serves as potential starting point for a new search. By example, if the output is such that a buyer is recommended one or more builders, a user can select one or more of the builders. This selection will then be used as a next input for new searches, again supplemented with external third party information, information already input by the user in this search chain, community input, associated metadata with each, associated fields with each. The output can be an array of other rooms available with the types of choices already searched. For example, if a Spanish style kitchen is shown, the results can be images of Spanish style bedrooms or Spanish style facades, or other appropriate pairings.

FIG. 1 is a diagrammatic example of an embodiment of the present system. A user begins the process 100 of the search at 101. He inputs various inputs 102, which can be one or more of a selection of an image of a room to begin in, objective desires of a house such as bedroom numbers or square footage, general tastes or feels hoped to be reflected in the house, or any other relevant information. As a result of that input, and with or without third party input 107, the system causes to be displayed certain images or other results representative of the search performed. The third party input can be outside market conditions, houses that are being promoted, trends, objective criteria based on user profiles or predicted user profiles, or otherwise. Generally, these third party inputs would be opaque to the user. As a result of this search, the user is provided a series of images relevant to the search. For instance, based on an initial input of the selection of a kitchen and the possible third party input, the results would include a series of pictures of kitchens that may be available to the user. The user is then given the opportunity to indicate his approval or disapproval of each image, shown in the figure as "luv" and "do not luv" 103. In a certain embodiment this would be a clickable heart that changes based on the preference. After a series of images have been indicated as approved or disapproved, the system would, with the potential benefit of third party input 107 or community tendencies 108, generate search results 104. The community tendencies 108 could include, for instance, the ultimate search results of other users who had similar "luv"/"do not luv" preferences or similar metadata associated with the "luv"/"do not luv". The addition of community tendencies 108 could bias the search results toward the historic results of other searches. The search results 104 could be a number of different results, including a listing of appropriate houses, a listing of appropriate builders, a listing of other rooms associated with the previous inputted rooms (e.g., if a type of kitchen was selected first, the "luv"/"do not luv" plus other inputs would generate an array of bathrooms associated with houses that have the types of kitchens "luv'd."), price points, neighborhood suggestions, and otherwise. To the extent the search results include additional images to have approval and disapproval, the user is again prompted to "luv"/"do not luv" 105. As a result of these preferences, in addition to potential third party input 107 or community tendencies 108, the second search results 106 are produced. The results of the search can be varied as before, e.g., specific home(s), builder(s), more room(s), price points, etc. The process will iterate 109 until a user stops 110, e.g., has sufficient information to act because he has chosen enough rooms, he has enough information to contact a builder and begin the process or reaches another appropriate point indicating sufficient information has been gained. As the user refines his selection, relevant data is transmitted back to be processed and added to the community tendencies 108 which allows for future users to have the benefits of the previous users ultimate desires based on previous indications and preferences. It is through this process that machine learning is introduced.

In certain embodiments, third party information and community preferences are introduced into the search to bias results. Information related to the results of searches and the behavior of users after and with a particular search is transmitted to the search provider for use in future searches. The analysis based on this information comprises the community preferences. If, for instance, analysis displays that users selections of particular floorplans and price points have previously resulted in users indicating ultimate preferences towards particular builders or particular neighborhoods, this information is transmitted back to the search provider. In certain embodiments, this tendency is used to recommend the same particular builders or particular neighborhoods in the future. Third party information in this circumstance includes outside information regarding inventory of houses, inventory of lots, price points, lending information, products to be promoted, neighborhood desirability or features, town desirability or features, or otherwise. This information is used as additional data for the searches performed.

Multiple-Party Collaboration

In certain embodiments, the system allows for collaboration between a plurality of users. In a particular embodiment, two users can interact in approximately real time, e.g., within the processing and transmission time between networked or interconnected computers.

In certain embodiments, the real time or quasi-real time communication is facilitated through real-time and near real time computing. In these embodiments, the intercommunication between the plurality of users depends not only on the messages transmitted between the users but also the time in which the messages are transmitted.

In some embodiments, projects are subdivided into digital zones, allowing multiple users to edit separate zones at the same time. In this way, the system partitions the work product into editable subsections. Each subsection is compiled into a complete project and displayed to the multiple users for simultaneous viewing. In particular embodiments, the system treats particular rooms of a target house as a different computing zone, allowing a user to indicate preferences or dislikes on images typical of one room while another indicates the same for a separate room.

Through the use of real time and near real time computing, multiple users at multiple computing stations can collaborate on a single project simultaneously, allowing feedback, advice and recommendations to be made between users in a cooperative, co-authored environment. In one particular embodiment of collaboration, multiple users, such as a married couple seeking a house, can review images related to the house and can provide feedback on the same images. In one particular embodiment, one collaborating party can mark a series of images as "luv'd" or "disliked." Those that are liked are then made accessible to the other collaborating party. The second collaborating party can indicate which of the previously liked are also liked by him or her.

In certain embodiments, icons or images are toggled to indicate the status of the collaboration between the multiple users. In a particular embodiment, the images can display up to two hearts on an image. If one user luv'd the image, one of the hearts turns red. If the other user similarly luv'd the image, the second heart turns red. If the second user disliked the image, an indication would appear that there is discord between the persons collaborating, such as a broken heart or a half filled red and black colored heart. In certain embodiments, after each party has indicated input on images, the system facilitates communication between the users. In certain embodiments, the tastes of one user can be packaged and subpackaged and transmitted to the other user on a house-by-house or project-by-project basis. For example, certain tastes and comments on pictures can be grouped and transmitted to be shared, while the similar actions for a second vacation home are not shared.

In various embodiments, the collaboration can occur during different phases of the search process. The search described above can be run independently by one or more person. The results of the search and be transmitted to another person with whom the first user wishes to collaborate, e.g., a spouse. The results of the first user's search can be commented on or luv'd by the collaborating user. For instance, images of kitchens can be transmitted as the result of a search to the second user. That second user can comment on the images, e.g, "I do not like that countertop." With a natural language parser, the comments of the collaborating user can be utilized as data for additional refinement of search. Additionally, or instead, the collaborating user can "luv" images or indicate disapproval of them. Likewise, this information (and associated metadata) can become input for future searches for additional collaboration.

Alternatively, entire searches can be conducted in parallel, and entire search results can be exchanged for collaboration, with the ability of a user to comment on his or her collaborating partner's preferences and vice versa. In these ways, an image can accumulate two colored hearts if both parties approve of the image, one colored or disapproved and one unselected, or one colored and one disapproved. This selection process can be used to encourage additional collaboration, and serve as input for additional searches.

Figure 2:
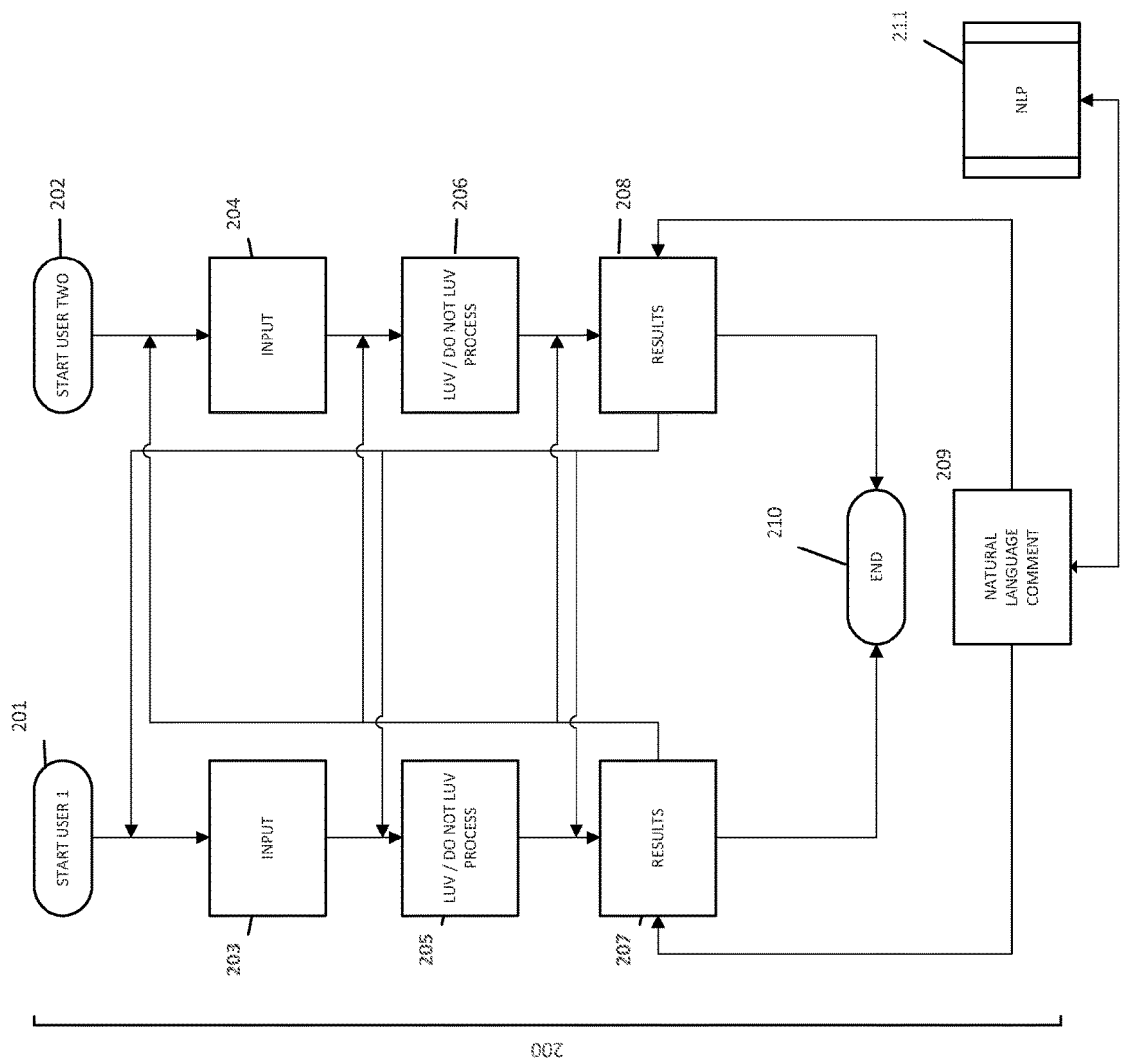
FIG. 2 is a diagrammatic representation of a collaborative iterative search process in accordance with certain embodiments of this present invention.

An embodiment of this collaborative iterative process 200 is shown in FIG. 2. There, the first user 201 and the second user 202 can, on separate communicatively coupled computing devices or sequentially on the same or different computing devices, review and indicate preferences of images related to houses through an input 203 and 204/"luv" "do not luv" 205 and 206/results 207 and 208 process such as the embodiment shown in the iterative process 100. At any time in the process 200, the results of one user's preferences can be transmitted to the second user to be used as an input in the user's search, for display as a final set, or for intermediary display for review and comment. For instance, a final result 207 of one user's search can be used as the input 204 or in conjunction with other input for the second user 202, who can then "luv"/"do not luv" the images 206. In this manner, the results of the first user 201 can be used in the iterative process 100 performed by the second user 202. Alternatively, the results 207 of the "luv" "do not luv" process 205 can be transmitted to the second user 202 who can himself evaluate the images and determine whether to indicate "luv" or "do not luv" on an image. In certain embodiments, the images are processed to include two hearts which can be marked as "luv'd" by one person and unmarked by the other, "luv'd" by both, or "luv'd" by one and not "luv'd" by the other. This information can then be used as a continued iterative process 100 by either or both of the users. Users are also encouraged to comment on the images of another user or their own image. This both aids in the collaborative process and can be used in a natural language parser 211 to be input for future searches 100 or to bias search results. The process 200 can iterate, with the results of one user's subprocess as inputs or biases into the other user's subprocess until enough information has been provided that the user can stop 210.

Figure 3:
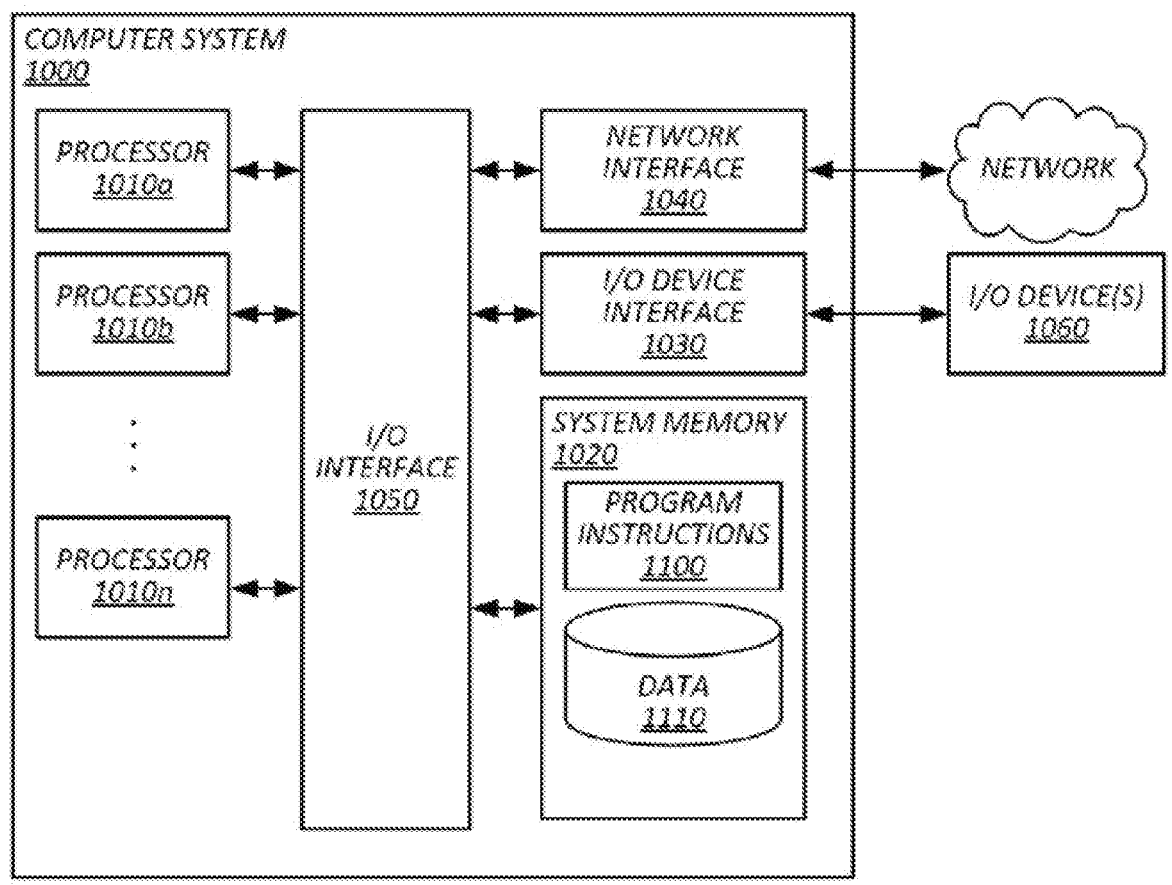
FIG. 3 is a computing device operable with the present system according to certain embodiments of the present invention.

FIG. 3 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

It is apparent that, among other benefits, the techniques described above improve the functionality of computers specific in the house purchasing (or other similar real property related searching) in performing the underlying processes by tracking the decision making process people typically employ in making decisions on house purchasing. In this manner, the storage and memory, cache and disk, requirements are smaller as searches are streamlined to include less extraneous or duplicate information.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

Certain aspects of this disclosure include a method of reviewing housing choices, comprising the steps of receiving from one or more sources images related to a plurality of features of housing offerings, said images being associated with other images related to features of housing offerings; presenting to a first user an initial prompt and based on response to that initial prompt, presenting a plurality of selectable images related to a first feature of housing offerings; receiving from the first user input regarding the desirability of the images related to the first feature of housing offerings; and iteratively: deriving, based on inputs regarding the desirability of the images related to one or more of the plurality of features of housing offerings, a hypothesis regarding a different feature of housing offerings; based at least in part on the hypothesis, presenting to the first user images related to the different feature of housing offerings; and receiving from the first user input regarding the desirability of the images related to the different feature of housing offerings.

Certain aspects of this disclosure include the claim above further comprising: presenting to a second user a second initial prompt and based on response to that second initial prompt, presenting a plurality of selectable images related to a second feature of housing offerings; receiving from the second user input regarding the desirability of the images related to the second feature of housing offerings; and iteratively deriving, based on inputs regarding the desirability of the images related to one or more of the plurality of features of housing offerings, a hypothesis regarding a different feature of housing offerings; based at least in part on the hypothesis, presenting to the second user images related to the different feature of housing offerings; and receiving from the second user input regarding the desirability of the images related to the different feature of housing offerings.

Certain aspects of this disclosure include the claim above further comprising transmitting to the second user information representative of the input of the first user.

Certain aspects of this disclosure include the claim above further comprising presenting to one or more of the first user and the second user external information related to third feature of housing offerings; receiving from one or more of the first user and the second user input regarding the desirability of the external information related to the third feature of housing offerings; and iteratively deriving, based on one or more of inputs regarding the external information related to features of housing offerings, a hypothesis regarding a different feature of housing offerings; based at least in part on the hypothesis, presenting to one or more of the first user and the second user external information related to housing offerings and images related to the different feature of housing offerings; and receiving from one or more of the first user and the second user input regarding the desirability of the external information related to housing offerings and images related to the different feature of housing offerings.

Certain aspects of this disclosure include the claim above wherein the iteratively deriving step further comprises deriving based on inputs from both the first user and the second user regarding the desirability of the images related to one or more of the plurality of features of housing offerings, a hypothesis regarding a different feature of housing offerings.

Certain aspects of this disclosure include the claim above wherein the different features of housing offerings comprise at least one of size of the house, style of the house, cost of the house, builder of the house, and location of the house.

Certain aspects of this disclosure include a multi-user search system, comprising at least one processor; and a non-transitory computer-readable medium storing instruction which, when executed by the at least one processor, cause the at least one processor to perform operations comprising receiving from one or more sources images related to a plurality of features of housing offerings, said images being associated with other images related to features of housing offerings: presenting to a first user an initial prompt and based on response to that initial prompt, presenting a plurality of selectable images related to a first feature of housing offerings; receiving from the first user input regarding the desirability of the images related to the first feature of housing offerings; and iteratively deriving, based on inputs regarding the desirability of the images related to one or more of the plurality of features of housing offerings, a hypothesis regarding a different feature of housing offerings; based at least in part on the hypothesis, presenting to the first user images related to the different feature of housing offerings; and receiving from the first user input regarding the desirability of the images related to the different feature of housing offerings.

Certain aspects of this disclosure include a multi-user search system above further wherein the non-transitory computer-readable medium storing instruction which, when executed by the at least one processor, cause the at least one processor to perform operations comprising presenting to a second user a second initial prompt and based on response to that second initial prompt, presenting a plurality of selectable images related to a second feature of housing offerings; receiving from the second user input regarding the desirability of the images related to the second feature of housing offerings; and iteratively deriving, based on inputs regarding the desirability of the images related to one or more of the plurality of features of housing offerings, a hypothesis regarding a different feature of housing offerings; based at least in part on the hypothesis, presenting to the second user images related to the different feature of housing offerings; and receiving from the second user input regarding the desirability of the images related to the different feature of housing offerings.

Certain aspects of this disclosure include a multi-user search system above further wherein the non-transitory computer-readable medium storing instruction which, when executed by the at least one processor, cause the at least one processor to perform operations comprising transmitting to the second user information representative of the input of the first user.

Certain aspects of this disclosure include a multi-user search system above further wherein the non-transitory computer-readable medium storing instruction which, when executed by the at least one processor, cause the at least one processor to perform operations comprising presenting to one or more of the first user and the second user external information related to third feature of housing offerings; receiving from one or more of the first user and the second user input regarding the desirability of the external information related to the third feature of housing offerings; and iteratively deriving, based on one or more of inputs regarding the external information related to features of housing offerings, a hypothesis regarding a different feature of housing offerings; based at least in part on the hypothesis, presenting to one or more of the first user and the second user external information related to housing offerings and images related to the different feature of housing offerings; and receiving from one or more of the first user and the second user input regarding the desirability of the external information related to housing offerings and images related to the different feature of housing offerings.

Certain aspects of this disclosure include a multi-user search system above wherein external information comprises one or more of neighborhood demographics, location, and information related to schools, businesses, transportation, and attractions.

Certain aspects of this disclosure include a multi-user search system above further wherein the non-transitory computer-readable medium storing instruction which, when executed by the at least one processor, cause the at least one processor to perform operations wherein the iteratively deriving step further comprises deriving based on inputs from both the first user and the second user regarding the desirability of the images related to one or more of the plurality of features of housing offerings, a hypothesis regarding a different feature of housing offerings.

Certain aspects of this disclosure include a multi-user search system above wherein the different features of housing offerings comprise at least one of size of the house, style of the house, cost of the house, builder of the house, and location of the house.

Certain aspects of this disclosure include a non-transitory computer-readable medium storing instruction which, when executed by the at least one processor, cause the at least one processor to perform operations comprising: receiving from one or more sources images related to a plurality of features of housing offerings, said images being associated with other images related to features of housing offerings: presenting to a first user an initial prompt and based on response to that initial prompt, presenting a plurality of selectable images related to a first feature of housing offerings; receiving from the first user input regarding the desirability of the images related to the first feature of housing offerings; and iteratively deriving, based on inputs regarding the desirability of the images related to one or more of the plurality of features of housing offerings, a hypothesis regarding a different feature of housing offerings; based at least in part on the hypothesis, presenting to the first user images related to the different feature of housing offerings; and receiving from the first user input regarding the desirability of the images related to the different feature of housing offerings.

Certain aspects of this disclosure include the non-transitory computer-readable medium storing instruction which, when executed by the at least one processor, cause the at least one processor to perform operations above further comprising: presenting to a second user a second initial prompt and based on response to that second initial prompt, presenting a plurality of selectable images related to a second feature of housing offerings; receiving from the second user input regarding the desirability of the images related to the second feature of housing offerings; and iteratively: deriving, based on inputs regarding the desirability of the images related to one or more of the plurality of features of housing offerings, a hypothesis regarding a different feature of housing offerings; based at least in part on the hypothesis, presenting to the second user images related to the different feature of housing offerings; and receiving from the second user input regarding the desirability of the images related to the different feature of housing offerings.

Certain aspects of this disclosure include the non-transitory computer-readable medium storing instruction which, when executed by the at least one processor, cause the at least one processor to perform operations above further wherein which, when executed by the at least one processor, cause the at least one processor to perform operations comprising transmitting to the second user information representative of the input of the first user.

Certain aspects of this disclosure include the non-transitory computer-readable medium storing instruction which, when executed by the at least one processor, cause the at least one processor to perform operations above further comprising presenting to one or more of the first user and the second user external information related to third feature of housing offerings; receiving from one or more of the first user and the second user input regarding the desirability of the external information related to the third feature of housing offerings; and iteratively: deriving, based on one or more of inputs regarding the external information related to features of housing offerings, a hypothesis regarding a different feature of housing offerings; based at least in part on the hypothesis, presenting to one or more of the first user and the second user external information related to housing offerings and images related to the different feature of housing offerings; and receiving from one or more of the first user and the second user input regarding the desirability of the external information related to housing offerings and images related to the different feature of housing offerings.

Certain aspects of this disclosure include the non-transitory computer-readable medium storing instruction which, when executed by the at least one processor, cause the at least one processor to perform operations above further wherein external information comprises one or more of neighborhood demographics, location, and information related to schools, businesses, transportation, and attractions.

Certain aspects of this disclosure include the non-transitory computer-readable medium storing instruction which, when executed by the at least one processor, cause the at least one processor to perform operations above further wherein which, when executed by the at least one processor, cause the at least one processor to perform operations wherein the iteratively deriving step further comprises deriving based on inputs from both the first user and the second user regarding the desirability of the images related to one or more of the plurality of features of housing offerings, a hypothesis regarding a different feature of housing offerings.

Certain aspects of this disclosure include the non-transitory computer-readable medium storing instruction which, when executed by the at least one processor, cause the at least one processor to perform operations above further wherein the different features of housing offerings comprise at least one of size of the house, style of the house, cost of the house, builder of the house, and location of the house.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to Y," "upon Y," "if Y," "when Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilising terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

We claim:

1. A method of reviewing housing choices, comprising the steps of:
   receiving, from one or more sources, images related to a plurality of features of housing offerings, said images being associated with other images related to features of housing offerings;
   presenting, to a first user, an initial prompt and based on response to that initial prompt, presenting a plurality of selectable images related to a first feature of housing offerings;
   receiving, from the first user, input regarding a desirability of the images related to the first feature of housing offerings, wherein the desirability comprises a rating of preference by the first user; and
   iteratively:
      deriving, based on inputs regarding the desirability of the images related to one or more of the plurality of features of housing offerings, a hypothesis regarding a different feature of housing offerings using inductive learning techniques, wherein the deriving the hypothesis using the inductive learning techniques includes:
         selecting a plurality of hypotheses based on one or more categories, wherein the plurality of hypotheses include at least one of a principal hypothesis or an intermediate hypothesis; and
         determining the hypothesis from the plurality of hypotheses when the hypothesis most corresponds with the inputs;
      based at least in part on the hypothesis, presenting, to the first user, images related to the different feature of housing offerings; and
      receiving, from the first user, input regarding the desirability of the images related to the different feature of housing offerings.

2. The method of claim 1, further comprising:
   presenting, to a second user, a second initial prompt and based on response to that second initial prompt, presenting a plurality of selectable images related to a second feature of housing offerings;
   receiving, from the second user, input regarding a desirability of the images related to the second feature of housing offerings; and
   iteratively:
      deriving, based on inputs regarding the desirability of the images related to one or more of the plurality of features of housing offerings, a hypothesis regarding a different feature of housing offerings;
      based at least in part on the hypothesis, presenting, to the second user, images related to the different feature of housing offerings; and
      receiving, from the second user, input regarding the desirability of the images related to the different feature of housing offerings.

3. The method of claim 2, further comprising transmitting, to the second user, information representative of the input of the first user.

4. The method of claim 3, further comprising
   presenting, to one or more of the first user and the second user, external information related to third feature of housing offerings;
   receiving, from one or more of the first user and the second user, input regarding a desirability of the external information related to the third feature of housing offerings; and
   iteratively:
      deriving, based on one or more of inputs regarding the external information related to features of housing offerings, a hypothesis regarding a different feature of housing offerings;
      based at least in part on the hypothesis, presenting, to one or more of the first user and the second user, external information related to housing offerings and images related to the different feature of housing offerings; and
      receiving, from one or more of the first user and the second user, input regarding the desirability of the external information related to housing offerings and images related to the different feature of housing offerings.

5. The method of claim 4, wherein the iteratively deriving further comprises deriving based on inputs from both the first user and the second user regarding the desirability of the images related to one or more of the plurality of features of housing offerings, a hypothesis regarding the different feature of housing offerings.

6. The method of claim 1, wherein the different features of housing offerings comprise at least one of a size of a house, a style of the house, a cost of the house, a builder of the house, and a location of the house.

7. A multi-user search system, comprising:
   at least one processor; and
   a non-transitory computer-readable medium storing instruction which, when executed by the at least one processor, cause the at least one processor to perform operations comprising:
      receiving, from one or more sources, images related to a plurality of features of housing offerings, said images being associated with other images related to features of housing offerings;

presenting, to a first user, an initial prompt and based on response to that initial prompt, presenting a plurality of selectable images related to a first feature of housing offerings;

receiving, from the first user, input regarding a desirability of the images related to the first feature of housing offerings, wherein the desirability comprises a rating of preference by the first user; and iteratively:
deriving, based on inputs regarding the desirability of the images related to one or more of the plurality of features of housing offerings, a hypothesis regarding a different feature of housing offerings using inductive learning techniques, wherein the deriving the hypothesis using the inductive learning techniques includes:
selecting a plurality of hypotheses based on one or more categories wherein the plurality of hypotheses include at least one of a principal hypothesis or an intermediate hypothesis; and
determining the hypothesis from the plurality of hypotheses when the hypothesis most corresponds with the inputs;
based at least in part on the hypothesis, presenting, to the first user, images related to the different feature of housing offerings; and
receiving, from the first user, input regarding the desirability of the images related to the different feature of housing offerings.

8. The system of claim 7, further wherein the non-transitory computer-readable medium storing instruction which, when executed by the at least one processor, cause the at least one processor to perform operations comprising:
presenting, to a second user, a second initial prompt and based on response to that second initial prompt, presenting a plurality of selectable images related to a second feature of housing offerings;
receiving, from the second user, input regarding a desirability of the images related to the second feature of housing offerings; and
iteratively:
deriving, based on inputs regarding the desirability of the images related to one or more of the plurality of features of housing offerings, a hypothesis regarding a different feature of housing offerings;
based at least in part on the hypothesis, presenting, to the second user, images related to the different feature of housing offerings; and
receiving, from the second user, input regarding the desirability of the images related to the different feature of housing offerings.

9. The system of claim 8, further wherein the non-transitory computer-readable medium storing instruction which, when executed by the at least one processor, cause the at least one processor to perform operations comprising transmitting, to the second user, information representative of the input of the first user.

10. The system of claim 9, further wherein the non-transitory computer-readable medium storing instruction which, when executed by the at least one processor, cause the at least one processor to perform operations comprising presenting, to one or more of the first user and the second user, external information related to third feature of housing offerings;

receiving, from one or more of the first user and the second user, input regarding a desirability of the external information related to the third feature of housing offerings; and iteratively:
deriving, based on one or more of inputs regarding the external information related to features of housing offerings, a hypothesis regarding a different feature of housing offerings;
based at least in part on the hypothesis, presenting, to one or more of the first user and the second user, external information related to housing offerings and images related to the different feature of housing offerings; and
receiving, from one or more of the first user and the second user, input regarding the desirability of the external information related to housing offerings and images related to the different feature of housing offerings.

11. The system of claim 10, wherein external information comprises one or more of neighborhood demographics, a location, and information related to schools, businesses, transportation, and attractions.

12. The system of claim 10, further wherein the non-transitory computer-readable medium storing instruction which, when executed by the at least one processor, cause the at least one processor to perform operations wherein the iteratively deriving further comprises deriving based on inputs from both the first user and the second user regarding the desirability of the images related to one or more of the plurality of features of housing offerings, a hypothesis regarding the different feature of housing offerings.

13. The system of claim 7, wherein the different features of housing offerings comprise at least one of a size of a house, a style of the house, a cost of the house, a builder of the house, and a location of the house.

14. A non-transitory computer-readable medium storing instruction which, when executed by at least one processor, cause the at least one processor to perform operations comprising:
receiving, from one or more sources, images related to a plurality of features of housing offerings, said images being associated with other images related to features of housing offerings;
presenting, to a first user, an initial prompt and based on response to that initial prompt, presenting a plurality of selectable images related to a first feature of housing offerings;
receiving, from the first user, input regarding a desirability of the images related to the first feature of housing offerings, wherein the desirability comprises a rating of preference by the first user; and
iteratively:
deriving, based on inputs regarding the desirability of the images related to one or more of the plurality of features of housing offerings, a hypothesis regarding a different feature of housing offerings using inductive learning techniques, wherein the deriving the hypothesis using the inductive learning techniques includes:
selecting a plurality of hypotheses based on one or more categories, wherein the plurality of hypotheses include at least one of a principal hypothesis or an intermediate hypothesis; and
determining the hypothesis from the plurality of hypotheses when the hypothesis most corresponds with the inputs;

based at least in part on the hypothesis, presenting, to the first user, images related to the different feature of housing offerings; and receiving, from the first user, input regarding the desirability of the images related to the different feature of housing offerings.

15. The medium storing instruction of claim 14, further wherein which, when executed by the at least one processor, cause the at least one processor to perform operations comprising:

presenting, to a second user, a second initial prompt and based on response to that second initial prompt, presenting a plurality of selectable images related to a second feature of housing offerings;

receiving, from the second user, input regarding a desirability of the images related to the second feature of housing offerings; and iteratively:

deriving, based on inputs regarding the desirability of the images related to one or more of the plurality of features of housing offerings, a hypothesis regarding a different feature of housing offerings;

based at least in part on the hypothesis, presenting, to the second user, images related to the different feature of housing offerings; and receiving, from the second user, input regarding the desirability of the images related to the different feature of housing offerings.

16. The medium storing instruction of claim 15, further wherein which, when executed by the at least one processor, cause the at least one processor to perform operations comprising transmitting, to the second user, information representative of the input of the first user.

17. The medium storing instruction of claim 16, further wherein which, executed by the at least one processor, cause the at least one processor to perform operations comprising presenting, to one or more of the first user and the second user, external information related to third feature of housing offerings;

receiving, from one or more of the first user and the second user, input regarding a desirability of the external information related to the third feature of housing offerings; and iteratively:

deriving, based on one or more of inputs regarding the external information related to features of housing offerings, a hypothesis regarding a different feature of housing offerings;

based at least in part on the hypothesis, presenting, to one or more of the first user and the second user, external information related to housing offerings and images related to the different feature of housing offerings; and receiving, from one or more of the first user and the second user, input regarding the desirability of the external information related to housing offerings and images related to the different feature of housing offerings.

18. The medium storing instruction of claim 17, further wherein external information comprises one or more of neighborhood demographics, a location, and information related to schools, businesses, transportation, and attractions.

19. The medium storing instruction of claim 17, further wherein which, when executed by the at least one processor, cause the at least one processor to perform operations wherein the iteratively deriving further comprises deriving based on inputs from both the first user and the second user regarding the desirability of the images related to one or more of the plurality of features of housing offerings, a hypothesis regarding the different feature of housing offerings.

20. The medium storing instruction of claim 14, further wherein the different features of housing offerings comprise at least one of a size of a house, a style of the house, a cost of the house, a builder of the house, and a location of the house.

* * * * *